US009183240B2

(12) United States Patent
Gokhale

(10) Patent No.: US 9,183,240 B2
(45) Date of Patent: *Nov. 10, 2015

(54) DISTRIBUTED INDEXING SYSTEM FOR DATA STORAGE

(71) Applicant: CommVault Systems, Inc., Oceanport, NJ (US)

(72) Inventor: Parag Gokhale, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/299,412

(22) Filed: Jun. 9, 2014

(65) Prior Publication Data

US 2015/0006480 A1 Jan. 1, 2015

Related U.S. Application Data

(63) Continuation of application No. 13/679,561, filed on Nov. 16, 2012, now Pat. No. 8,805,807, which is a continuation of application No. 12/166,854, filed on Jul. 2, 2008, now Pat. No. 8,335,776.

(51) Int. Cl.
*G06F 17/30* (2006.01)
*G06F 3/06* (2006.01)

(52) U.S. Cl.
CPC .... *G06F 17/30321* (2013.01); *G06F 17/30286* (2013.01); *G06F 17/30336* (2013.01); *G06F 17/30575* (2013.01); *G06F 3/065* (2013.01); *G06F 3/0643* (2013.01)

(58) Field of Classification Search
None
See application file for complete search history.

(56) References Cited

U.S. PATENT DOCUMENTS

| 4,084,231 | A | 4/1978 | Capozzi et al. |
| 4,267,568 | A | 5/1981 | Dechant et al. |
| 4,283,787 | A | 8/1981 | Chambers |
| 4,417,321 | A | 11/1983 | Chang et al. |
| 4,641,274 | A | 2/1987 | Swank |
| 4,654,819 | A | 3/1987 | Stiffler et al. |

(Continued)

FOREIGN PATENT DOCUMENTS

| AU | 2004227949 | 10/2004 |
| CA | 2498174 | 3/2004 |

(Continued)

OTHER PUBLICATIONS

Armstead et al., "Implementation of a Campus-Wide Distributed Mass Storage Service: The Dream vs. Reality," IEEE, 1995, pp. 190-199.

(Continued)

*Primary Examiner* — Richard Bowen
(74) *Attorney, Agent, or Firm* — Knobbe, Martens, Olson & Bear, LLP

(57) ABSTRACT

A distributed indexing system spreads out the load on an index of stored data in a data storage system. Rather than maintain a single index, the distributed indexing system maintains an index in each media agent of a federated data storage system and a master index that points to the index in each media agent. In some embodiments, the distributed indexing system includes an index server (or group of servers) that handles indexing requests and forwards the requests to the appropriate distributed systems. Thus, the distributed indexing system, among other things, increases the availability and fault tolerance of a data storage index.

18 Claims, 5 Drawing Sheets

(56) References Cited

U.S. PATENT DOCUMENTS

| | | |
|---|---|---|
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,420,996 A | 5/1995 | Aoyagi |
| 5,448,724 A | 9/1995 | Hayashi |
| 5,454,099 A | 9/1995 | Myers et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,619,644 A | 4/1997 | Crockett et al. |
| 5,621,795 A | 4/1997 | Baker et al. |
| 5,638,509 A | 6/1997 | Dunphy et al. |
| 5,642,496 A | 6/1997 | Kanfi |
| 5,659,746 A | 8/1997 | Bankert et al. |
| 5,673,381 A | 9/1997 | Huai et al. |
| 5,699,361 A | 12/1997 | Ding et al. |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,806,065 A * | 9/1998 | Lomet ........................ 707/610 |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,963,944 A * | 10/1999 | Adams ................... 1/1 |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,134,558 A | 10/2000 | Hong et al. |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,425,126 B1 | 7/2002 | Branson et al. |
| 6,438,562 B1 * | 8/2002 | Gupta et al. ................ 707/696 |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,564,228 B1 | 5/2003 | O'Connor |
| 6,658,436 B2 | 12/2003 | Oshinsky et al. |
| 6,658,526 B2 | 12/2003 | Nguyen et al. |
| 6,721,767 B2 | 4/2004 | De Meno et al. |
| 6,760,723 B2 | 7/2004 | Oshinsky et al. |
| 6,883,110 B1 | 4/2005 | Goddard |
| 6,976,053 B1 | 12/2005 | Tripp et al. |
| 6,978,447 B1 | 12/2005 | Okmianski |
| 6,988,149 B2 | 1/2006 | Odenwald |
| 7,003,641 B2 | 2/2006 | Prahlad et al. |
| 7,035,880 B2 | 4/2006 | Crescenti et al. |
| 7,054,867 B2 | 5/2006 | Bosley et al. |
| 7,107,298 B2 | 9/2006 | Prahlad et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,209,972 B1 | 4/2007 | Ignatius et al. |
| 7,246,207 B2 | 7/2007 | Kottomtharayil et al. |
| 7,315,923 B2 | 1/2008 | Retnamma et al. |
| 7,315,924 B2 | 1/2008 | Prahlad et al. |
| 7,380,072 B2 | 5/2008 | Kottomtharayil et al. |
| 7,389,311 B1 | 6/2008 | Crescenti et al. |
| 7,395,282 B1 | 7/2008 | Crescenti et al. |
| 7,401,154 B2 | 7/2008 | Ignatius et al. |
| 7,409,509 B2 | 8/2008 | Devassy et al. |
| 7,440,982 B2 | 10/2008 | Lu et al. |
| 7,447,692 B2 | 11/2008 | Oshinsky et al. |
| 7,454,569 B2 | 11/2008 | Kavuri et al. |
| 7,484,054 B2 | 1/2009 | Kottomtharayil et al. |
| 7,490,207 B2 | 2/2009 | Amarendran |
| 7,500,053 B1 | 3/2009 | Kavuri et al. |
| 7,536,291 B1 | 5/2009 | Retnamma et al. |
| 7,536,426 B2 | 5/2009 | Chen et al. |
| 7,543,125 B2 | 6/2009 | Gokhale |
| 7,546,324 B2 | 6/2009 | Prahlad et al. |
| 7,581,077 B2 | 8/2009 | Ignatius et al. |
| 7,603,386 B2 | 10/2009 | Amarendran et al. |
| 7,606,844 B2 | 10/2009 | Kottomtharayil |
| 7,613,748 B2 | 11/2009 | Brockway et al. |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,739,459 B2 | 6/2010 | Kottomtharayil et al. |
| 7,747,579 B2 | 6/2010 | Prahlad et al. |
| 7,757,043 B2 | 7/2010 | Kavuri et al. |
| 7,769,961 B2 | 8/2010 | Kottomtharayil et al. |
| 7,801,864 B2 | 9/2010 | Prahlad et al. |
| 7,802,067 B2 | 9/2010 | Prahlad et al. |
| 7,809,914 B2 | 10/2010 | Kottomtharayil et al. |
| 7,827,160 B2 | 11/2010 | Kuhr et al. |
| 8,335,776 B2 | 12/2012 | Gokhale |
| 8,805,807 B2 | 8/2014 | Gokhale |
| 2002/0111956 A1 | 8/2002 | Yeo et al. |
| 2004/0064568 A1 | 4/2004 | Arora et al. |
| 2005/0039051 A1 | 2/2005 | Erofeev |
| 2005/0071195 A1 | 3/2005 | Cassel et al. |
| 2005/0166260 A1 | 7/2005 | Betts et al. |
| 2006/0149826 A1 | 7/2006 | Rooney |
| 2006/0168154 A1 * | 7/2006 | Zhang et al. ................ 709/220 |
| 2007/0094277 A1 * | 4/2007 | Fachan et al. ................ 707/100 |
| 2007/0094310 A1 | 4/2007 | Passey et al. |
| 2007/0266074 A1 | 11/2007 | Dellacona |
| 2008/0033934 A1 | 2/2008 | Richards et al. |

(56) References Cited

U.S. PATENT DOCUMENTS

| | | | |
|---|---|---|---|
| 2008/0243781 A1 | 10/2008 | Kuhr et al. | |
| 2009/0100069 A1 | 4/2009 | Bosley et al. | |
| 2009/0157666 A1 | 6/2009 | Gehrke et al. | |
| 2009/0187588 A1 | 7/2009 | Thambiratnam et al. | |
| 2009/0210429 A1 | 8/2009 | Agrawal et al. | |
| 2009/0265306 A1* | 10/2009 | Barsness et al. | 707/2 |

FOREIGN PATENT DOCUMENTS

| | | |
|---|---|---|
| DE | 69415115 | 8/1999 |
| DE | 60020978 | 4/2006 |
| EP | 0259912 | 3/1988 |
| EP | 0405926 | 1/1991 |
| EP | 0467546 | 1/1992 |
| EP | 0774715 | 5/1997 |
| EP | 0809184 | 11/1997 |
| EP | 541281 | 4/1998 |
| EP | 0899662 | 3/1999 |
| EP | 0981090 | 2/2000 |
| EP | 1384135 | 7/2010 |
| GB | 2409553 | 6/2005 |
| GB | 2410106 | 7/2005 |
| GB | 2425199 | 10/2006 |
| GB | 2435756 | 9/2007 |
| GB | 2447361 | 9/2008 |
| JP | 4267443 | 9/2004 |
| JP | 4198050 | 10/2004 |
| WO | WO 95/13580 | 5/1995 |
| WO | WO 99/12098 | 3/1999 |

OTHER PUBLICATIONS

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Eitel, "Backup and Storage Management in Distributed Heterogeneous Environments," IEEE, 1994, pp. 124-126.
Gait, "The Optical File Cabinet: A Random-Access File System for Write-On Optical Disks," IEEE Computer, vol. 21, No. 6, pp. 11-22 (1988) (see in particular figure 5 in p. 15 and recitation in claim 5).
IBM Technical Disclosure Bulletin, vol. 24, No. 5, Oct. 1981 New York, US, pp. 2404-2406, K.L. Huff, "Data Set Usage Sequence Number".
Jander, "Launching Storage-Area Net," Data Communications, US, McGraw Hill, NY, vol. 27, No. 4(Mar. 21, 1998), pp. 64-72.
Operating Systems Review (SIGOPs), vol. 25, No. 5, May 1991, New York, US, "The Design and Implementation of a Log-Structured File System", p. 4, paragraph 3.3-p. 5.
Rosenblum et al., "The Design and Implementation of a Log-Structure File System," Operating Systems Review SIGOPS, vol. 25, No. 5, New York, US, pp. 1-15 (May 1991).

* cited by examiner

DISTRIBUTED INDEXING SYSTEM FOR DATA STORAGE

CROSS-REFERENCE TO RELATED APPLICATIONS

Any and all applications for which a foreign or domestic priority claim is identified in the Application Data Sheet, or any correction thereto, are hereby incorporated by reference under 37 CFR 1.57.

BACKGROUND

Computer systems contain large amounts of information. This information includes personal information, such as financial information, customer/client/patient contact information, business information, audio/visual information, and much more. This information also includes information related to the correct operation of the computer system, such as operating system files, application files, user settings, and so on. With the increased reliance on computer systems to store critical information, the importance of protecting information has grown. Traditional storage systems receive an identification of a file to protect, and then create one or more secondary copies, such as backup files, containing the contents of the file. These secondary copies can then later be used to restore the original data should anything happen to the original data.

In corporate environments, protecting information is generally part of a routine process that information technologists perform for many computer systems within an organization. For example, a company might back up critical computing systems related to e-commerce such as databases, file servers, web servers, and so on as part of a daily, weekly, or monthly maintenance schedule. The company may also protect computing systems used by each of its employees, such as those used by an accounting department, marketing department, engineering department, and so forth.

Current storage management systems employ a number of different methods to perform storage operations on electronic data. For example, data can be stored in primary storage as a primary copy or in secondary storage as various types of secondary copies including, as a backup copy, a snapshot copy, a hierarchical storage management copy ("HSM"), as an archive copy, and as other types of copies.

A primary copy of data is generally a production copy or other "live" version of the data that a software application uses and is generally in the native format of that application. Primary copy data may be maintained in a local memory or other high-speed storage device that allows for relatively fast data access if necessary. Such primary copy data is typically intended for short term retention (e.g., several hours or days) before some or all of the data is stored as one or more secondary copies, for example to prevent loss of data in the event a problem occurred with the data stored in primary storage.

Secondary copies include point-in-time data and are typically intended for long-term retention (e.g., weeks, months or years depending on retention criteria, for example as specified in a storage policy as further described herein) before some or all of the data is moved to other storage or discarded.

Secondary copies may be indexed so users can browse and restore the data at another point in time. After certain primary copy data is backed up, a pointer or other location indicia such as a stub may be placed in the primary copy to indicate the current location of that data. One process for creating a content index and classifying data is described in U.S. patent application Ser. No. 11/564,180, which is incorporated herein by reference. Once a content index is available, client systems no longer need to be involved when searching for data and can be focused on more desirable tasks such as running production applications.

Although the content index saves client resources, the usefulness of the content index can cause the content index itself to become a resource in high demand. When the content index is relied upon for processing searches and finding data among many copies, the content index can become a single point of failure for performing these operations, and the performance of searches and other operations may suffer based on the available performance of the content index.

The foregoing examples of some existing limitations are intended to be illustrative and not exclusive. Other limitations will become apparent to those of skill in the art upon a reading of the Detailed Description below. These and other problems exist with respect to data storage management systems.

Figure 1:
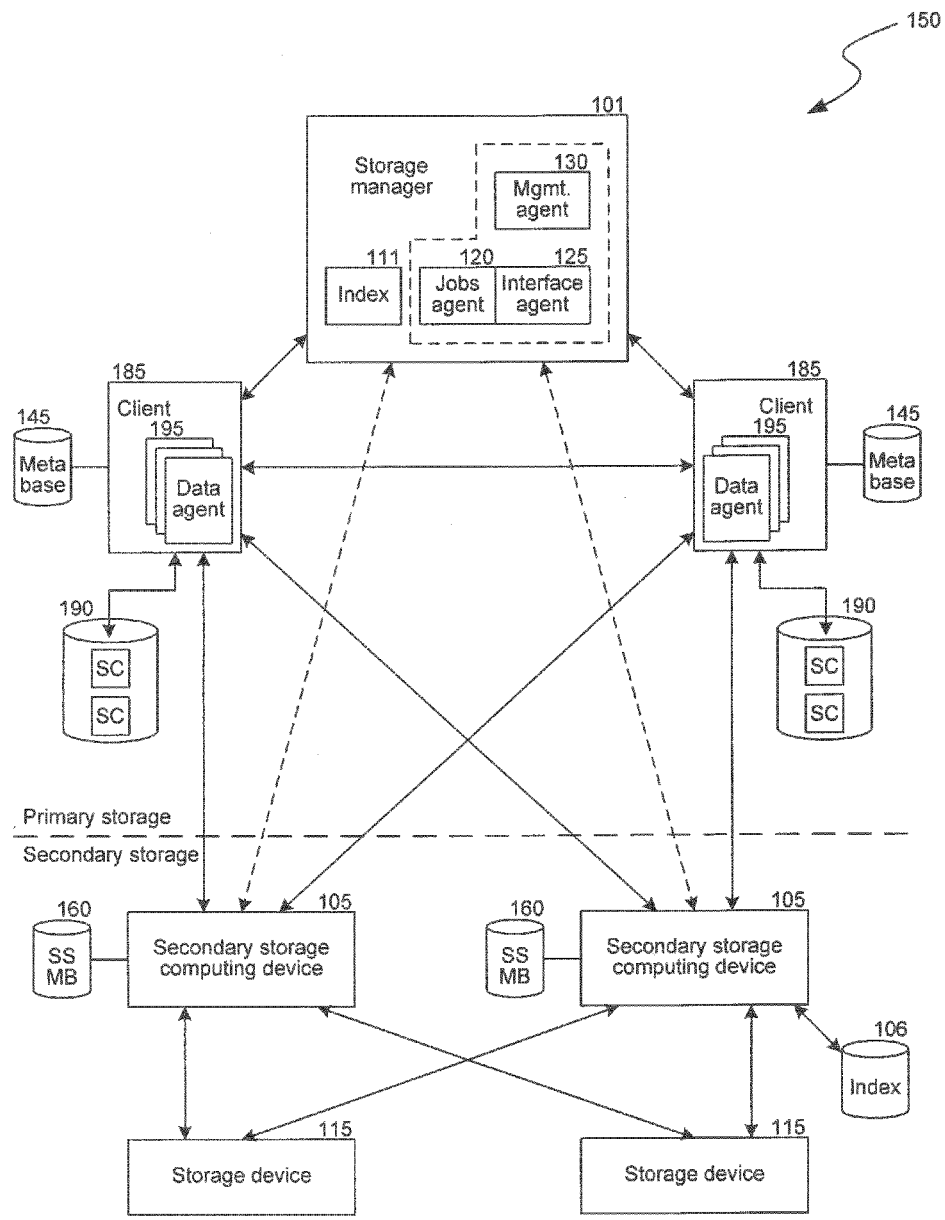
FIG. 1 illustrates one arrangement of resources in a computing network in accordance with the principles of the present invention.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 101 is first introduced and discussed with respect to FIG. 1).

DETAILED DESCRIPTION OF THE PREFERRED EMBODIMENT

The headings provided herein are for convenience only and do not necessarily affect the scope or meaning of the claimed invention.

Overview

Described herein is a distributed indexing system that spreads out the load on an index of stored data in a data storage system. Rather than maintain a single index, the distributed indexing system maintains an index in each media agent of a federated or hierarchical data storage system and a master index that points to the index in each media agent. In some embodiments, the distributed indexing system includes an index server (or group of servers) that handles indexing requests and forwards the requests to the appropriate distributed systems. Thus, the distributed indexing system increases the availability and fault tolerance of a data storage index.

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Suitable System

FIG. 1 and the discussion herein provide a brief, general description of a suitable computing environment in which the invention can be implemented. Although not required, aspects of the invention are described in the general context of computer-executable instructions, such as routines executed by a general-purpose computer, e.g., a server computer, wireless device, or personal computer. Those skilled in the relevant art will appreciate that the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer" are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer such as a mobile or portable device, and thus, while certain hardware platforms are described herein, aspects of the invention are equally applicable to nodes on a network.

FIG. 1 illustrates one arrangement of resources in a computing network in accordance with the principles of the present invention. As shown, storage operation cell 150 may generally include a storage manager 101, a data agent 195, a media agent 105, a storage device 115, and, in some embodiments, may include certain other components such as a client 185, a data or information store 190, database 111, jobs agent 120, an interface module 125, and a management agent 130. Such system and elements thereof are exemplary of a modular storage system such as the CommVault QiNetix system, and the CommVault GALAXY backup system, available from CommVault Systems, Inc. of Oceanport, N.J., and further described in U.S. patent application Ser. No. 09/610,738, which is incorporated herein by reference in its entirety.

A storage operation cell, such as cell 150, may generally include combinations of hardware and software components associated with performing storage operations on electronic data. According to some embodiments of the invention, storage operations cell 50 may be related to backup cells and provide some or all of the functionality of backup cells as described in application Ser. No. 09/354,058, which is hereby incorporated by reference in its entirety. However, in certain embodiments, storage operation cells may also perform additional types of storage operations and other types of storage management functions that are not generally offered by backup cells.

In accordance with certain embodiments of the present invention, additional storage operations performed by storage operation cells may include creating, storing, retrieving, and migrating primary storage data (e.g., 190) and secondary storage data (which may include, for example, snapshot copies, backup copies, HSM copies, archive copies, and other types of copies of electronic data) stored on storage devices 115. In some embodiments, storage operation cells may also provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In some embodiments, storage operations may be performed according to various storage preferences, for example as expressed by a user preference or storage policy. A storage policy is generally a data structure or other information source that includes a set of preferences and other storage criteria associated with performing a storage operation. The preferences and storage criteria may include, but are not limited to, a storage location, relationships between system components, network pathway to utilize, retention policies, data characteristics, compression or encryption requirements, preferred system components to utilize in a storage operation, and other criteria relating to a storage operation. Thus, a storage policy may indicate that certain data is to be stored in a specific storage device, retained for a specified period before being aged to another tier of secondary storage, copied to secondary storage using a specified number of streams, etc. A storage policy may be stored in a storage manager database 111, to archive media as metadata for use in restore operations or other storage operations, or to other locations or components of the system.

A schedule policy may specify when to perform storage operations and how often and may specify performing certain storage operations on sub-clients of data and how to treat those sub-clients. A sub-client may represent static or dynamic associations of portions of data of a volume and are typically mutually exclusive. Thus, a portion of data may be given a label and the association is stored as a static entity in an index, database, or other storage location used by the system. Sub-clients may also be used as an effective administrative scheme of organizing data according to data type, department within the enterprise, storage preferences, etc.

For example, an administrator may find it preferable to separate e-mail data from financial data using two different sub-clients having different storage preferences, retention criteria, etc. Storage operation cells may contain not only physical devices, but also may represent logical concepts, organizations, and hierarchies. For example, a first storage operation cell 150 may be configured to perform a first type of storage operations such as HSM operations, which may include backup or other types of data migration, and may include a variety of physical components including a storage manager 101 (or management agent 130), a media agent 105, a client component 185, and other components as described herein. A second storage operation cell may contain the same or similar physical components, however, it may be configured to perform a second type of storage operations such as SRM operations, and may include as monitoring a primary data copy or performing other known SRM operations.

Thus, as can be seen from the above, although the first and second storage operation cells are logically distinct entities configured to perform different management functions (i.e., HSM and SRM respectively), each cell may contain the same or similar physical devices in both storage operation cells. Alternatively, in other embodiments, different storage operation cells may contain some of the same physical devices and not others. For example, a storage operation cell 150 configured to perform SRM tasks may contain a media agent 105, client 185, or other network device connected to a primary storage volume, while a storage operation cell 150 configured to perform HSM tasks may instead include a media agent 105, client 185, or other network device connected to a secondary storage volume and not contain the elements or components associated with and including the primary storage volume. These two cells, however, may each include a different storage manager 101 that coordinates storage operations via the same media agents 105 and storage devices 115. This "overlapping" configuration allows storage resources to be accessed by more than one storage manager 101 such that multiple paths exist to each storage device 115 facilitating failover, load balancing and promoting robust data access via alternative routes.

Alternatively, in some embodiments, the same storage manager 101 may control two or more cells 150 (whether or not each storage cell 150 has its own dedicated storage manager 100). Moreover, in certain embodiments, the extent or type of overlap may be user-defined (through a control console (not shown)) or may be automatically configured to optimize data storage and/or retrieval.

Data agent 195 may be a software module or part of a software module that is generally responsible for copying, archiving, migrating, and recovering data from client computer 185 stored in an information store 190 or other memory location. Each client computer 185 may have at least one data agent 195 and the system can support multiple client computers 185. In some embodiments, data agents 195 may be distributed between client 185 and storage manager 101 (and any other intermediate components (not shown)) or may be deployed from a remote location or its functions approximated by a remote process that performs some or all of the functions of data agent 195.

Embodiments of the present invention may employ multiple data agents 195 each of which may backup, migrate, and recover data associated with a different application. For example, different individual data agents 195 may be designed to handle Microsoft Exchange data, Lotus Notes data, Microsoft Windows 2000 file system data, Microsoft Active Directory Objects data, and other types of data known in the art. Other embodiments may employ one or more generic data agents 195 that can handle and process multiple data types rather than using the specialized data agents described above.

If a client computer 185 has two or more types of data, one data agent 195 may be required for each data type to copy, archive, migrate, and restore the client computer 185 data. For example, to backup, migrate, and restore all of the data on a Microsoft Exchange 2000 server, the client computer 185 may use one Microsoft Exchange 2000 Mailbox data agent 195 to backup the Exchange 2000 mailboxes, one Microsoft Exchange 2000 Database data agent 195 to backup the Exchange 2000 databases, one Microsoft Exchange 2000 Public Folder data agent 195 to backup the Exchange 2000 Public Folders, and one Microsoft Windows 2000 File System data agent 195 to backup the client computer's 185 file system. These data agents 195 would be treated as four separate data agents 195 by the system even though they reside on the same client computer 185.

Alternatively, other embodiments may use one or more generic data agents 195, each of which may be capable of handling two or more data types. For example, one generic data agent 195 may be used to back up, migrate, and restore Microsoft Exchange 2000 Mailbox data and Microsoft Exchange 2000 Database data while another generic data agent may handle Microsoft Exchange 2000 Public Folder data and Microsoft Windows 2000 File System data, etc.

Data agents 195 may be responsible for arranging or packing data to be copied or migrated into a certain format such as an archive file. Nonetheless, it will be understood this represents only one example and any suitable packing or containerization technique or transfer methodology may be used if desired. Such an archive file may include a list of files or data objects copied in metadata, the file and data objects themselves. Moreover, any data moved by the data agents may be tracked within the system by updating indexes associated appropriate storage managers or media agents.

Generally speaking, storage manager 101 may be a software module or other application that coordinates and controls storage operations performed by storage operation cell 150. Storage manager 101 may communicate with some or all elements of storage operation cell 150 including client computers 185, data agents 195, media agents 105, and storage devices 115, to initiate and manage system backups, migrations, and data recovery.

Storage manager 101 may include a jobs agent 120 that monitors the status of some or all storage operations previously performed, currently being performed, or scheduled to be performed by storage operation cell 150. Jobs agent 120 may be communicatively coupled with an interface agent 125 (typically a software module or application). Interface agent 125 may include information processing and display software, such as a graphical user interface ("GUI"), an application program interface ("API"), or other interactive interface through which users and system processes can retrieve information about the status of storage operations. Through interface 125, users may optionally issue instructions to various storage operation cells 150 regarding performance of the storage operations as described and contemplated by the present invention. For example, a user may modify a schedule concerning the number of pending snapshot copies or other types of copies scheduled as needed to suit particular needs or requirements. As another example, a user may employ the GUI to view the status of pending storage operations in some or all of the storage operation cells in a given network or to monitor the status of certain components in a particular storage operation cell (e.g., the amount of storage capacity left in a particular storage device).

Storage manager 101 may also include a management agent 130 that is typically implemented as a software module or application program. In general, management agent 130 provides an interface that allows various management components 101 in other storage operation cells 150 to communicate with one another. For example, assume a certain network configuration includes multiple cells 150 adjacent to one another or otherwise logically related in a WAN or LAN configuration (not shown). With this arrangement, each cell 150 may be connected to the other through each respective interface agent 125. This allows each cell 150 to send and receive certain pertinent information from other cells 150 including status information, routing information, information regarding capacity and utilization, etc. These communication paths may also be used to convey information and instructions regarding storage operations.

For example, a management agent 130 in first storage operation cell 150 may communicate with a management agent 130 in a second storage operation cell 150 regarding the status of storage operations in the second storage operation cell. Another illustrative example includes the case where a management agent 130 in first storage operation cell 150 communicates with a management agent 130 in a second storage operation cell to control the storage manager 101 (and other components) of the second storage operation cell via the management agent 130 contained in the storage manager 100.

Another illustrative example is the case where management agent 130 in the first storage operation cell 150 communicates directly with and controls the components in the second storage management cell 150 and bypasses the storage manager 101 in the second storage management cell. If desired, storage operation cells 150 can also be organized hierarchically such that hierarchically superior cells control or pass information to hierarchically subordinate cells or vice versa.

Storage manager 101 may also maintain an index, a database, or other data structure 111. The data stored in database 111 may be used to indicate logical associations between components of the system, user preferences, management tasks, media containerization and data storage information or other useful data. For example, the storage manager 101 may use data from database 111 to track logical associations between media agent 105 and storage devices 115 (or movement of data as containerized from primary to secondary storage).

Generally speaking, a media agent, which may also be referred to as a secondary storage computing device, 105 may be implemented as software module that conveys data, as directed by storage manager 101, between a client computer 185 and one or more storage devices 115 such as a tape library, a magnetic media storage device, an optical media storage device, or any other suitable storage device. In one embodiment, secondary computing device 105 may be communicatively coupled with and control a storage device 115. A secondary computing device 105 may be considered to be associated with a particular storage device 115 if that secondary computing device 105 is capable of routing and storing data to particular storage device 115.

In operation, a secondary computing device 105 associated with a particular storage device 115 may instruct the storage device to use a robotic arm or other retrieval means to load or eject a certain storage media, and to subsequently archive, migrate, or restore data to or from that media. Secondary computing device 105 may communicate with a storage device 115 via a suitable communications path such as a SCSI or fiber channel communications link. In some embodiments, the storage device 115 may be communicatively coupled to a data agent 105 via a Storage Area Network ("SAN").

Each secondary storage computing device 105 may maintain an index 106, a database, or other data structure which may store index data generated during backup, migration, and restore and other storage operations as described herein. For example, performing storage operations on Microsoft Exchange data may generate index data. Such index data provides a secondary computing device 105 or other external device with a fast and efficient mechanism for locating data stored or backed up. Thus, a secondary storage computing device index 106 or a storage manager database 111 may store data associating a client 185 with a particular secondary computing device 105 or storage device 115. For example, the association may be specified in a storage policy. A database or other data structure in secondary computing device 105 may indicate where specifically the client 185 data is stored in storage device 115, what specific files were stored, and other information associated with storage of client 185 data. In some embodiments, such index data may be stored along with the data backed up in a storage device 115, with an additional copy of the index data written to index cache in a secondary storage device. Thus, the data is readily available for use in storage operations and other activities without having to be first retrieved from the storage device 115. As explained in more detail below, indexes may be distributed throughout the federated system, and managed by a central index server.

Generally speaking, information stored in cache is typically recent information that reflects certain particulars about operations that have recently occurred. After a certain period, this information is sent to secondary storage and tracked. This information may need to be retrieved and uploaded back into a cache or other memory in a secondary computing device before data can be retrieved from storage device 115. In some embodiments, the cached information may include information regarding format or containerization of archive or other files stored on storage device 115.

In some embodiments, certain components may reside and execute on the same computer. For example, in some embodiments, a client computer 185 such as a data agent 195, or a storage manager 101 coordinates and directs local archiving, migration, and retrieval application functions as further described in U.S. patent application Ser. No. 09/610,738. This client computer 185 can function independently or together with other similar client computers 185.

Moreover, as shown in FIG. 1, clients 185 and secondary computing devices 105 may each have associated metabases (145 and 160, respectively). However in some embodiments each "tier" of storage, such as primary storage, secondary storage, tertiary storage, etc., may have multiple metabases or a centralized metabase, as described herein. For example, in FIG. 1, rather than a separate metabase 145 associated with each client 185, the metabases on this storage tier may be centralized as discussed further herein. Similarly, second and other tiers of storage may have either centralized or distributed metabases. Moreover, mixed architectures systems may be used if desired, that may include a first tier centralized metabase system coupled to with a second tier storage system having distributed metabases and vice versa, etc.

Moreover, in operation, a storage manager 101 or other management module may keep track of certain information that allows the storage manager to select, designate, or otherwise identify metabases to be searched in response to certain queries as further described herein. Movement of data between primary and secondary storage may also involvement movement of associated metadata and other tracking information as further described herein.

Index Server

In previous systems, an index was generally stored in a single location on one media agent. This led to limited availability and slow failover (because the entire index needed to be brought up at a new location when a failure occurred). Using the previous approach, each media agent provided indexing data to a dumb network share. The index data described data classified and indexed by that media agent. Other media agents could access the share and read the index to discover the data stored by other media agents. This approach reduced fault tolerance because the network was required to be available for the indexed data to be copied to the network share.

Figure 3:
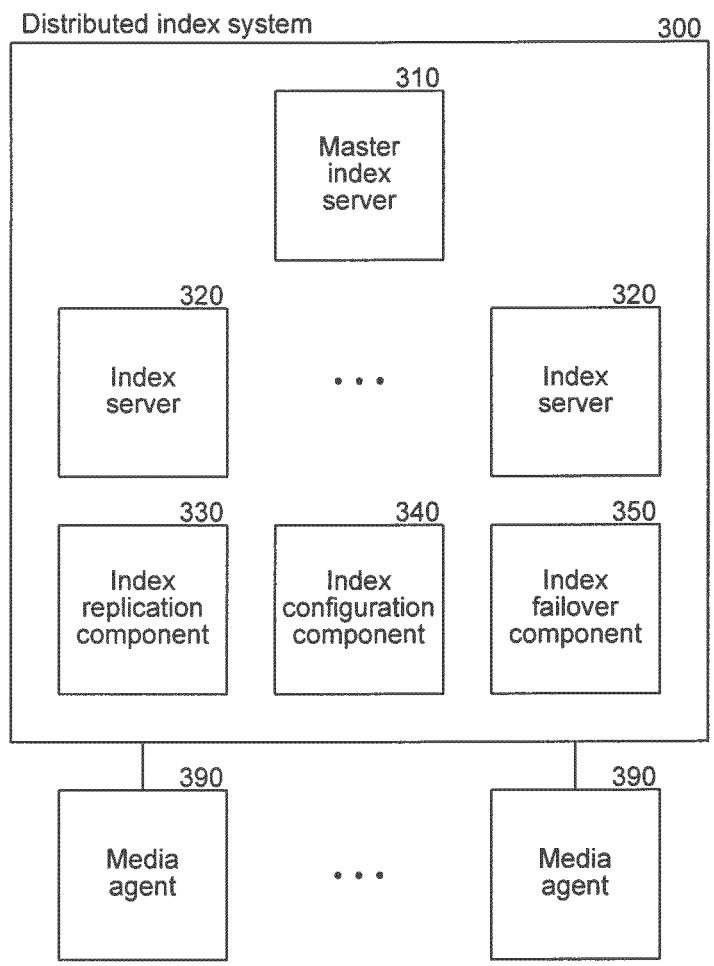
FIG. 3 is a block diagram that illustrates components of a distributed index system in one embodiment.

FIG. 3 is a block diagram that illustrates components of the distributed index system in one embodiment. The distributed index system 300 contains a master index server 310, one or more index servers 320, an index replication component 330, an index configuration component 340, and an index failover component 350. The master index server 310 keeps a list of each index server 320 and information about the data indexed by each index server 320. The index server 320 indexes data for one or more media agents 390. Each index server 310 may contain index data only for the media agent(s) 390 served by that index server 320 or each index server 320 might contain the same index data. In the latter case, the index replication component 330 copies the index data from each index server 320 to other index servers so that certain index servers have the same index data. This makes the index data available at many different locations so that requests can be distributed to lessen the load on any particular index server. Each index server 320 is generally not co-located with the master index server 310, but rather at or with each media agent or storage component. In this way network delays and problems can be avoided. Each index server may be implemented as a virtual machine.

The index configuration component 340 stores configuration information, such as which index server 320 is assigned to which media agent 390, whether index data at each index server 320 is replicated to each other index server, and so forth. The index failover component 350 determines how index data is provided, such as based on a failover policy, in response to index requests when one or more index servers fail or are made unavailable for requests due to routine maintenance or other operations. When the index data is replicated to each index server 320, the index failover component 350 may update the master index server 310 to forward requests previously directed to one index server to any of the other index servers having the same index data.

The distributed index system described herein introduces an indexing server that provides a unified approach to storing index data. Each media agent periodically provides updated index data to the index server, such as by transmitting to the index server a reference to the index data locally stored by the media agent. If the index server is unavailable, the media agent simply continues to locally store the index data until the index server can be reached. The index server then retrieves the index data based on the reference and updates a central or common index. The index server may delete the index data from the media agent to indicate that the index data has been incorporated into the central index. Fault tolerance is increased when the media agent is not depending on a remote network connection in real time. The index server increases accessibility, because data requestors can contact the index server at a single location instead of multiple individual media agents to perform data storage operations (e.g., searches, classification, and so forth). In some embodiments, the index server can be configured by an administrator or other user to specify where to store index data, how much redundancy should be used, and so on.

The index server removes the need for network index sharing. For example, a primary indexing server can be configured for each media agent. Alternatively, the media agent itself can act as the primary indexing server for that media agent, or a dedicated indexing server may be used by several media agents. These and many other variations are possible based on the techniques described herein.

Figure 2:
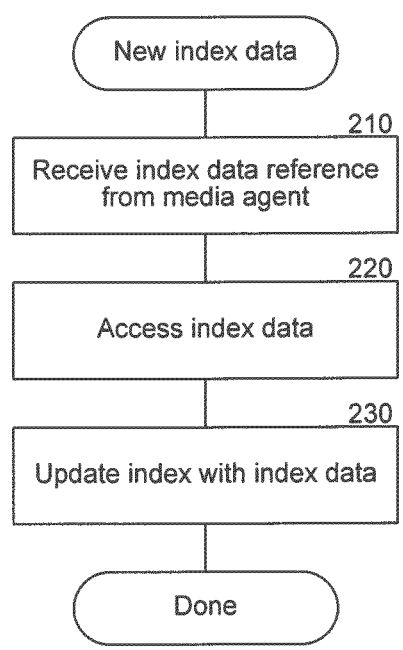
FIG. 2 is a flow diagram that illustrates the processing of an index server when new index data is available from a media agent.

Referring back to FIG. 2, a flow diagram illustrates the processing of the index server when new index data is available from a media agent. In step 210, the index server receives a reference to new index data from the media agent. For example, the media agent may keep a log of new index data on a network share for which the reference provides the address. In step 220, the index server accesses the new index data based on the received reference. For example, if the index data is located on a network share, then the index server accesses the network share and copies any relevant files located there. In step 230, the index server updates the index based on the new index data. For example, the index data may be in the form of keyword maps that can be copied directly into the index. Optionally, the index server may provide an indication (not shown) to the media agent indicating that the index data has been received and processed. This allows the media agent to recover the space being used by the index data.

In some embodiments, the distributed index system includes a main index server that tracks each other index server. As described herein, the main index server may respond to index requests and provide access to other index servers as appropriate based on the nature of the request. For example, if an index request specifies data managed by a particular media agent, the main index server may forward the request to the index server assigned to that media agent. Thus, the main index server provides a single location to send requests while still providing the availability and fault tolerance benefits of distributed index servers.

Figure 4:
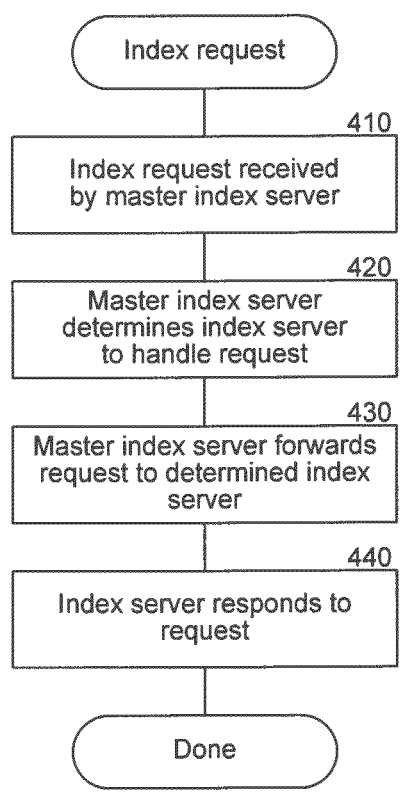
FIG. 4 is a flow diagram that illustrates a process for requesting information from an index through a main index server in one embodiment.
Figure 5:
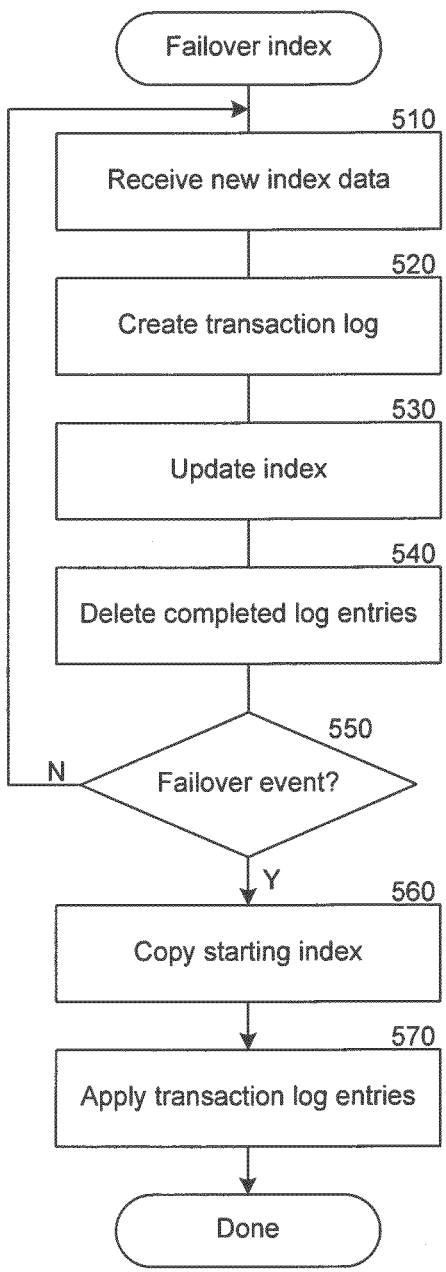
FIG. 5 is a flow diagram that illustrates a process for resuming an index upon failover.

FIGS. 4-5 are representative flow diagrams that depict processes used in some embodiments. These flow diagrams do not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented.

FIG. 4 is a flow diagram that illustrates an example of a process for requesting information from an index through a centralized or master index server. In step 410, the master index server receives a request to access a distributed index. For example, the master index server may receive a request from a client or requesting computer to search for all documents modified on a particular date and tracked by a data storage system. Indexed metadata obtained from stored documents enables the system to execute such a search.

In step 420, the master index server determines which particular index server will handle the request. For example, if the request is seeking data about an engineering document, then the master index server may determine the index server that indexes information for an engineering department of an organization. In step 430, the master index server forwards the index request to the determined index server.

In step 440, the index server responds to the request. For example, if the request is a search then the index server searches its index and responds with any matching data in the index. In some embodiments, the master index server may select multiple index servers to handle a request. For example, if the request is a broad search and different index servers contain different indexes, then the master index server may forward the request to each index server to identify matching data. In other words, if the master index server identifies more than one potential match based on this search, then it requests potentially matching data from more than one index server. A user or client receiving the multiple search results can then determine next steps, such as determining which of the search results best satisfies the search when a broad, possibly ambiguous, search is requested.

Following step 440, the system may perform any of various data storage operations. For example, under the federated data storage system of FIG. 1, the system may request, under the process of FIG. 4, the location of a document stored within the data storage system. After the index server responds to the request by identifying one or more documents that satisfy the request, the data storage system may then restore the one or more documents. This restoration may be to a computer different from the original client computer that initiated the request.

In some embodiments, the index server provides an index that is resumable on failover without having to make a copy of the entire index. For example, the index server may make a copy to some other location after each flag or checkpoint (e.g., using continuous data protection/replication, hardware mirrors, or other common data copying techniques). For example, continuous data protection can provide a marker that, when compared to a corrupted central index, reflects where the system is to resume updating the central index with data from a remote index.

The index may then be restored to a new location using data restoration techniques, including maintaining a readily available secondary machine with the index that is updated after each checkpoint. Alternatively or additionally, the system may maintain a transaction log to identify a resumption or starting point for updating the index. For example, if the system finds the central index to be corrupted, then that index, or a previous version, is compared to the transaction log to identify a point at which to resume updating of the index with data from another index.

FIG. 5 is a flow diagram that illustrates a process for resuming an index upon failover. In step 510, an index server receives new index data. For example, the index server may receive the new index data from a media agent in response to the completion of a storage operation that copied new data from a client system to a data storage server. In step 520, the index server creates transaction log files based on the new index data. In step 530, the index server updates the index based on the received index data. In step 540, after the updating job finishes, the index server deletes the transaction log entries that have been incorporated into the index.

In decision block 550, if the index is later found to be corrupted or becomes unavailable, then the process continues at step 560, else the process loops to block 510 to wait for additional new index data. In step 560, the index server copies a starting index based on the previous index to a new index server. In step 570, the new index server accesses the transaction log and processes any pending transaction log entries using the process described above. In this way, a new index server can take over for an old index server without losing any index data. If the old index server did not consume all of the new index data, then the new index server will continue processing where the old index server left off based on the transaction log.

In some embodiments, the distributed indexing system stores the index at multiple locations. More than one index server may be configured for each media agent. In that case, the index housed by each index server is replicated to one or more of its peers. The replication happens both ways. For example, one media agent may use a particular index server as a primary index server while another media agent uses the same index server as a secondary index server. Therefore, data from each index server may be replicated to each of the other index servers, since each index server may have new index data that the other index servers do not have.

In some embodiments, the distributed index system selects an index location for a media agent or an index location to handle an index request based on convenience or access needs. For example, an index server that is close to a media agent geographically or based on network topology may be selected as the index server for that media agent. As another example, the index server for a media agent may be selected by using a round robin or alternating technique that rotates among several index servers to reduce the burden on each index server.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. In addition, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What is claimed is:

1. A method of creating indexes of secondary copies of data, the method comprising;
   copying primary data stored in one or more primary storage devices to one or more secondary storage devices, wherein copying the primary data to the secondary storage device creates a secondary copy on the one or more secondary storage devices;
   indexing a first portion of the secondary copy with a first index server, wherein indexing the first portion of the secondary copy creates a first index of the first portion of secondary data;
   indexing a second portion of the secondary copy with a second index server, wherein indexing the second portion of secondary copy creates a second index of the second portion of secondary data;
   copying the first index to the second index server so that the first index is available at both the first and second index servers;
   identifying that a plurality of requests for secondary data are associated with the first index; and
   distributing the plurality of requests for the secondary data associated with the first index among the first and second index servers to lessen a load on the first index server.

2. The method of claim 1, further comprising:
   receiving a request for primary data;
   determining that a secondary copy of the requested primary data exists in the one or more secondary storage devices; and
   sending the request to at least one of first and second index servers to retrieve a portion of the secondary copy that relates to the requested primary memory.

3. The method of claim 1 further comprising copying the second index to the first index server so that the second index is available at both the first and second index servers.

4. The method of claim 1, further comprising:
   receiving a request for primary data;
   determining that a secondary copy of the requested primary data exists in the one or more secondary storage devices; and
   sending the request for to both the first and second index servers to retrieve, based on the first and second indexes, a portion of the secondary copy that relates to the requested primary memory.

5. The method of claim 1, further comprising:
   logging new index data on a network share and associated with a network address; and
   providing to the first and second index servers the network address.

6. The method of claim 1, further comprising:
   receiving a request for a document or for information about the document;
   determining a department or office within a business organization associated with the document; and
   forwarding the received request to one of first and second index servers associated the determined department or office.

7. The method of claim 1 further comprising copying the first and second indexes to a third index server.

8. The method of claim 1 further comprising combining the data in the first and second indexes to create a third index.

9. The method of claim 8 further comprising distributing requests associated with the first index among at least one of the second and third index servers when the first index server is unavailable.

10. A system that creates indexes of secondary copies of data, the system comprising:
    a storage manager comprising computer hardware, the storage manager configured to copy primary data stored in one or more primary storage devices to one or more secondary storage devices, wherein copying the primary data to the secondary storage device creates a secondary copy on the one or more secondary storage devices;
    a first index server comprising computer hardware having one or more computer processors, the first index server creates a first index by indexing a first portion of the secondary copy stored on the one or more secondary storage devices;
    a second index server comprising computer hardware having one or more computer processors, the second index server creates a second index by indexing index a second portion of the secondary copy stored on the one or more secondary storage devices;
    an index replication component comprising computer hardware, the index replication component configured to direct the copying the first index associated with the first index server to the second index server so that the first index is available at both the first and second index servers;
    a third index server comprising computer hardware that is configured to identify that a plurality of requests for the secondary data are associated with the first index, the third index server further configured to distribute the plurality of requests for the secondary data associated with the first index among the first and second index servers to lessen a load on the first index server.

11. The system of claim 10, wherein the third index server receives a request for primary data and determines that a secondary copy of the requested primary data exists in the one or more secondary storage devices, wherein the third index server sends the request to at least one of first and second index servers to retrieve a portion of the secondary copy that relates to the requested primary memory.

12. The system of claim 10 wherein the index replication component is further configured to copy the second index associated with the second index server to the first index server so that the second index is available at both the first and second index servers.

13. The system of claim 10, wherein the third index server receives a request for primary data and determines that a secondary copy of the requested primary data exists in the one or more secondary storage devices, wherein the third index server sends the request for to both the first and second index servers to retrieve, based on the first and second indexes, a portion of the secondary copy that relates to the requested primary memory.

14. The system of claim 10, wherein the storage manager is further configured to:
   log new index data on a network share and associated with a network address; and
   provide to the first and second index servers the network address.

15. The system of claim 10, wherein the third index server is further configured to:
   receive a request for a document or for information about the document;
   determine a department or office within a business organization associated with the document; and
   forward the received request to one of first and second index servers associated the determined department or office.

16. The system of claim 10 wherein the index replication component is further configured to copy the first and second indexes to the third index server.

17. The method of claim 10 wherein the index replication component combines the data in the first and second indexes to create a third index.

18. The system of claim 17 wherein the third index server is configured to distribute requests associated with the first index among the second and third index servers when the first index server is unavailable.

* * * * *